(12) United States Patent
Mueller et al.

(10) Patent No.: US 8,888,659 B2
(45) Date of Patent: Nov. 18, 2014

(54) MOTOR VEHICLE DRIVE TRAIN

(71) Applicants: Uwe Mueller, Stuttgart (DE); Detlef Schnitzer, Denkendorf (DE)

(72) Inventors: Uwe Mueller, Stuttgart (DE); Detlef Schnitzer, Denkendorf (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/769,334

(22) Filed: Feb. 17, 2013

(65) Prior Publication Data

US 2013/0296131 A1 Nov. 7, 2013

Related U.S. Application Data

(63) Continuation-in-part of application No. PCT/EP2011/004269, filed on Aug. 25, 2011.

(30) Foreign Application Priority Data

Sep. 22, 2010 (DE) .......................... 10 2010 046 235

(51) Int. Cl.
*B60W 10/02* (2006.01)
*B60W 10/04* (2006.01)
*B60W 10/10* (2012.01)
*B60W 10/06* (2006.01)
*B60W 30/18* (2012.01)
*B60K 17/02* (2006.01)
*F16D 48/06* (2006.01)
*B60K 17/26* (2006.01)

(52) U.S. Cl.
CPC ............... *B60W 10/10* (2013.01); *B60W 10/02* (2013.01); *B60K 17/26* (2013.01); *F16D 2500/5043* (2013.01); *B60W 10/06* (2013.01); *B60W 30/18072* (2013.01); *B60K 17/02* (2013.01); *F16D 48/06* (2013.01); *F16D 2500/10425* (2013.01); *F16D 2500/5085* (2013.01); *F16D 2500/10412* (2013.01)
USPC .......................................................... 477/175

(58) Field of Classification Search
USPC ......... 475/221–223, 225, 230, 237, 295, 298, 475/302, 303, 343; 477/174, 175; 180/274, 180/233
See application file for complete search history.

(56) References Cited

U.S. PATENT DOCUMENTS 4,476,953 A * 10/1984 Hiraiwa ........................ 180/249
4,541,503 A *  9/1985 Akutagawa et al. .......... 180/249
4,605,087 A *  8/1986 Ashauer et al. ............... 180/248

(Continued)

FOREIGN PATENT DOCUMENTS

DE        30 26 489      2/1982
DE       199 20 065     12/2000

(Continued)

*Primary Examiner* — Justin Holmes
(74) *Attorney, Agent, or Firm* — Klaus J. Bach

(57) ABSTRACT

In a motor vehicle drive train device with a drive engine and a drive train which has a first coupling unit in the form of a clutch arranged close to the drive engine and at least one second coupling unit arranged in the flow of force from the drive engine close to the drive wheels of the vehicle, a control unit is provided which controls the coupling units and which has an overrun operating mode wherein, at a first point, the drive engine can be disconnected from the drive train by opening the clutch and, at a second point, the coupling units close to the drive wheels can be disengaged so as to disconnect the drive train also from the drive wheels.

5 Claims, 1 Drawing Sheet

(56) References Cited

U.S. PATENT DOCUMENTS

| | | | |
|---|---|---|---|
| 4,669,332 A * | 6/1987 | Katayama | 475/206 |
| 5,951,428 A | 9/1999 | Itoh et al. | |
| 8,651,205 B2 * | 2/2014 | Chess et al. | 180/6.2 |
| 2010/0041506 A1 * | 2/2010 | Cooper et al. | 475/223 |
| 2010/0094519 A1 * | 4/2010 | Quehenberger et al. | 701/69 |
| 2012/0238394 A1 * | 9/2012 | Valente et al. | 475/221 |

FOREIGN PATENT DOCUMENTS

| | | |
|---|---|---|
| DE | 10 2005 034 091 | 1/2007 |
| DE | 10 2007 013 258 | 9/2008 |
| DE | 10 2009 005 378 | 4/2010 |
| EP | 0 224 144 | 3/1987 |
| EP | 0 860 624 | 8/1998 |

\* cited by examiner

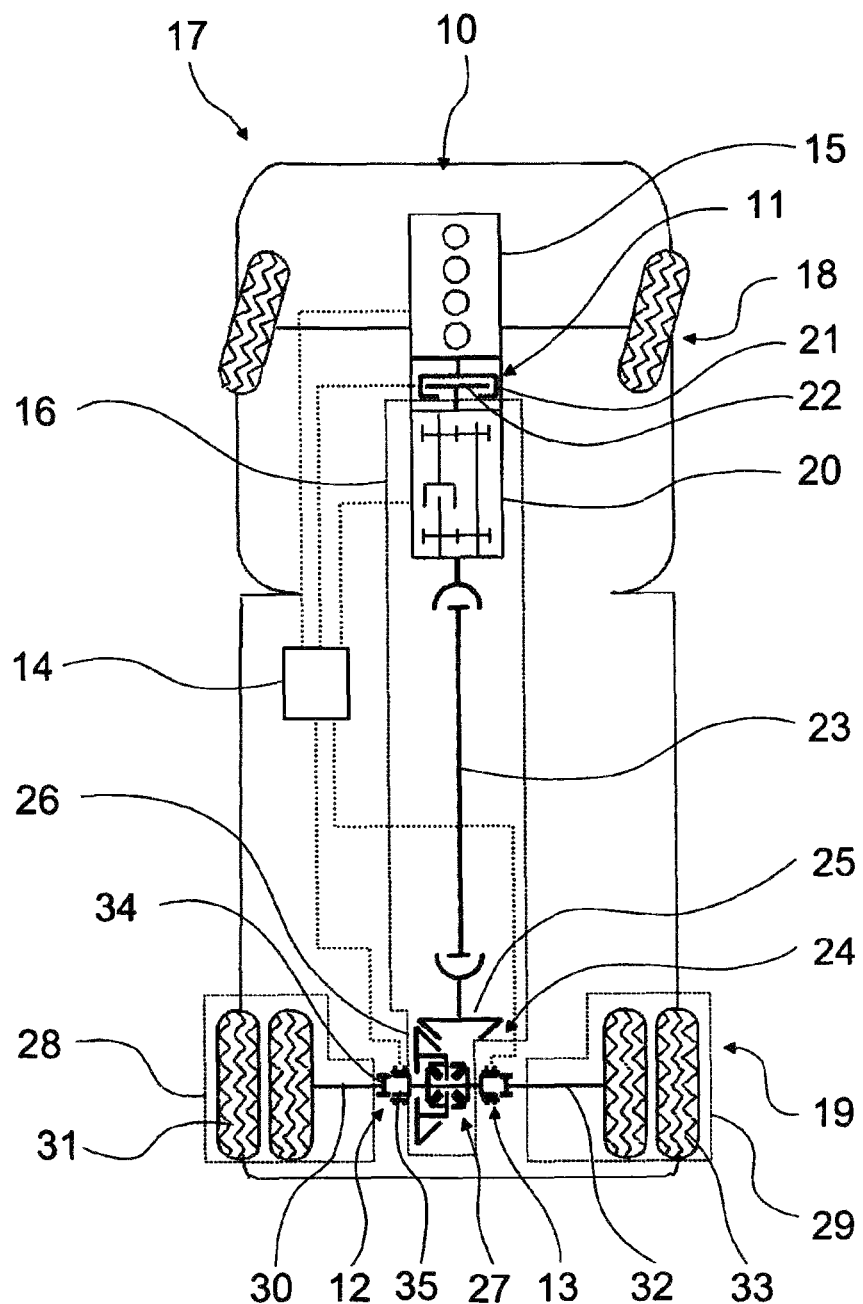

MOTOR VEHICLE DRIVE TRAIN

This is a Continuation-In-Part application of pending international patent application PCT/EP2011/004269 filed Aug. 25, 2011, and claiming the priority of German patent application 10 2010 0462357 filed Sep. 22, 2010.

BACKGROUND OF THE INVENTION

The invention relates to a motor vehicle drive train with a first coupling unit in the form of a clutch for connecting the drive train to an engine and at least one additional coupling unit for connecting the drive wheels to the drive train.

A motor vehicle drive train which has a first coupling unit and at least one second coupling unit arranged in the flow of force after the first coupling unit, and with a control unit for controlling the coupling units the control unit having an overrun operating mode which is provided, at least in an overrun condition, to disconnect a drive engine from a part of the drive train by opening one of the coupling units is already known from DE 199 20 065 A1.

DE 30 26 489 A1 discloses a motor vehicle drive train device with a drive train which has a first coupling unit and at least one second coupling unit arranged in the flow of force after the first coupling unit, and with a control unit for controlling the coupling units which control unit has an overrun operating mode which is provided, at least in an overrun condition, to disconnect a drive engine from a part of the drive train by opening one of the coupling units, the control unit being provided to disconnect the drive train by additional opening of the other ones of the coupling units at a second point in the overrun operating mode.

It is the principal object of the present invention to provide a motor vehicle drive train device with which fuel can be saved in a particularly advantageous manner.

SUMMARY OF THE INVENTION

In a motor vehicle drive train device with a drive engine and a drive train which has a first coupling unit in the form of a clutch arranged close to the drive engine and at least one second coupling unit arranged in the flow of force from the drive engine close to the drive wheels of the vehicle, a control unit is provided which controls the coupling units and which has an overrun operating mode wherein, at a first point, the drive engine can be disconnected from the drive train by opening the clutch and, at a second point, the coupling units close to the drive wheels can be disengaged so as to disconnect the drive train also from the drive wheels.

It is proposed that the control unit is provided for disconnecting the drive train by additionally opening the other ones of the coupling units at a second point in the overrun operating mode. This means that advantageously a large part of the drive train can be uncoupled from a rotary movement, as a result of which in particular friction losses and churning losses in a drive train can be advantageously reduced and thus particularly advantageously fuel can be saved. A "coupling unit" in this case is to be understood to mean in particular a unit with at least two coupling elements which are arranged rotatably relative to one another, which can be connected together for co-rotation by a non-positive and/or positive lock. A "non-positive and/or positive lock" in this case is to be understood to mean in particular a detachable connection, with a holding force being transmitted between the two coupling elements preferably by a geometric engagement of the coupling elements in one another and/or a frictional force between the coupling elements. A "flow of force" in this case is to be understood to mean in particular a transmission of a torque from the drive engine which generates the torque via the various components in the drive train up to drive wheels which discharge the torque. "Arranged in a flow of force after the first coupling unit" in this connection is to be understood to mean in particular that the second coupling unit in the flow of force emanating from the drive engine is incorporated in the drive train after the first coupling unit. A "control and/or regulating unit" is to be understood to mean in particular a unit with at least one control unit. A "control unit" is to be understood to mean in particular a unit with a processor unit and with a memory unit, and also with an operating program stored in the memory unit. In principle, the control unit may have a plurality of interconnected control units which are preferably provided to communicate with each other via a bus system, such as in particular a CAN bus system. "Provided" is to be understood to mean in particular specially programmed, designed and/or equipped. An "overrun operating mode" in this case is to be understood to mean in particular an operating program for an overrun condition stored in the control and/or regulating unit. An "overrun condition" is to be understood to mean a state of the motor vehicle in which a torque is introduced from the drive wheels into the drive train, in particular a flow of force from the drive wheels in the direction of the drive engine into at least a part of the drive train. In contrast, in a traction condition a torque is introduced from the drive engine into the drive train for driving the vehicle.

The drive train may have only one driven axle or alternatively what is called a tandem axle with a disengageable axle in accordance with DE 10 2007 013 258 A1. A tandem axle of this type has a permanently driven axle and an axle which can be disengaged via one or more clutches. In particular, positive clutches are arranged in lateral shafts of the disengageable axle, and a multi-disc clutch is arranged in a connecting shaft between the two axles. When a tandem axle is used, the second coupling unit is arranged on the permanently driven axle.

Further, it is proposed that the control and/or regulating unit be provided initially to actuate the first coupling unit for activating and deactivating the overrun operating mode. This means that a flow of force in the drive train can be interrupted or restored particularly simply. "Actuating the coupling unit" in this case is to be understood to mean in particular that the coupling unit is switched from a closed state into an opened state, or from an opened state into a closed state. In this case, an actuator is acted upon for example with an actuating pressure by controlling via the control and/or regulating unit, as a result of which the actuator actuates a shift element of the coupling unit for opening or closing the coupling unit.

Further, it is proposed that the control and/or regulating unit be provided to actuate the at least one second coupling unit after the actuation of the first coupling unit for activating and deactivating the overrun operating mode. This means that in particular the second coupling unit can be advantageously actuated in a simple manner.

Furthermore, it is proposed that at least the at least one second coupling unit be formed as a positive-engagement coupling unit. This means that in particular the second coupling unit can be configured in a structurally simple manner. A "positive-engagement coupling unit" in this case is to be understood to mean in particular a coupling unit, the coupling elements of which are mounted rotatably relative to each other can be connected together for co-rotation by means of a positive engagement.

Further, it is proposed that the motor vehicle drive train device have two second coupling units which are arranged parallel to one another in a flow of force. This means that the drive train can be disconnected particularly advantageously.

Further, a method for a motor vehicle drive train device, in particular a motor vehicle drive train device with a drive train is proposed, in which by opening a first coupling unit in a overrun operating mode a drive engine is disconnected from a part of the drive train, the drive train being disconnected at a second point by opening the at least one second coupling unit, as a result of which advantageously a large part of the drive train is uncoupled from a rotary movement.

Further, it is proposed that the overrun operating mode be activated when an overrun condition is recognized, which means that the overrun operating mode is activated in particular at a particularly advantageous time.

In addition, it is proposed that in at least one operating mode initially the first coupling unit which is upstream in a flow of force be actuated for activating and/or deactivating the overrun operating mode, which interrupts or restores a flow of force in the drive train particularly simply.

Furthermore, it is proposed that in at least one operating mode after the actuation of the first coupling unit which is upstream in the flow of force the second coupling unit be actuated for activating and/or deactivating the overrun operating mode, which means that in particular the second coupling unit can be actuated advantageously in a simple manner.

It is also proposed that for deactivating the overrun operating mode the at least one second coupling unit be synchronized by means of a drive engine, which means that the at least one second coupling unit can be actuated in particular rapidly.

Further, it is proposed that in at least one operating mode initially the at least one second coupling unit be opened for activating a second overrun operating mode, which means that the drive train can advantageously be disconnected initially close to drive wheels.

Further, it is proposed that the at least one second coupling unit be unloaded for opening by means of the drive engine, which means that the at least one second coupling unit can be actuated particularly rapidly and simply.

The invention will become more readily apparent from the following description of an exemplary embodiments thereof with reference to the accompanying drawing. The drawing, the description and the claims contain numerous features in combination. The person skilled in the art will expediently also consider the features individually and combine them to form useful further combinations.

BRIEF DESCRIPTION OF THE DRAWING

FIG. 1 shows a diagrammatic representation of a motor vehicle with a motor vehicle drive train device according to the invention.

DESCRIPTION OF AN EXEMPLARY EMBODIMENT

The motor vehicle 17 has a front axle 18 and a driven rear axle 19. The front axle 18 is not driven. The motor vehicle 17 comprises a drive train 10. The drive train 10 has a drive engine 15 which is provided for generating a drive torque for the motor vehicle 17. The drive engine 15 is designed as an internal combustion engine. In principle, it is also conceivable for the drive engine 15 to be designed as a different drive engine which appears useful to the person skilled in the art, for example as an electric motor. In principle, it is also conceivable for the drive train 10, in addition to the drive engine 15 which is an internal combustion engine, to have a further drive engine, for example, an electric motor, which succeeds the drive engine 15 which is an internal combustion engine in a flow of force or is connected in parallel with the drive engine.

In order to provide a plurality of gear steps with different step-up ratios, the drive train 10 has a gearbox device 20. The gearbox device 20 is arranged in the flow of force after the drive engine 15. The gearbox device 20 has a plurality of gearwheel pairs, each of which has a different speed-increasing ratio. In order to select the gear steps, the gearbox device 20 has a plurality of gear actuators. The gear actuators actuate gear shift elements which incorporate the individual gearwheel pairs into the flow of force and thereby transmit a torque. The gearbox device 20 is formed as an auxiliary-range gearbox device which has a main unit, a splitter unit preceding the main unit and a range-change unit succeeding the main unit. In principle, it is however also conceivable for the gearbox device 20 to be formed as a different gearbox device which appears useful to the person skilled in the art, for example as an epicyclic gearbox device.

In order to split the drive train 10, the drive train 10 has a first coupling unit 11. The first coupling unit 11 is arranged in the flow of force between the drive engine 15 and the gearbox device 20. The first coupling unit 11 is formed as a multi-disc clutch. In order to transmit a torque, the first coupling unit 11 has two clutch halves 21, 22 which are provided to be connected together for co-rotation via a frictional contact. For this, the clutch halves 21, 22 each have a plurality of clutch discs. The clutch discs of the first clutch half 21 and of the second clutch half 22 are arranged nested in each case. The first coupling unit 11 is formed as a normally-closed multi-disc clutch. In a non-actuated state, the first coupling unit 11 is closed and can transmit a torque. In an actuated state, the first coupling unit 11 is opened. By acting upon a clutch actuator, which is not illustrated in greater detail, with an actuating pressure, the two clutch halves 21, 22 are disconnected from each other. A frictional engagement between the two clutch halves 21, 22 is thereby interrupted, which prevents transmission of the torque.

In order to transmit the torque from the gearbox device to the rear axle 19, the drive train 10 has a drive shaft 23. The drive shaft 23 is formed as an articulated shaft. The drive shaft 23 connects the gearbox device 20 to a final drive 24 of the rear axle 19. The final drive 24 comprises a bevel gear 25 which is connected to the articulated shaft, which bevel gear meshes with a bevel gear 26 arranged on the rear axle 19. The final drive 24 comprises a differential 27 which is partially connected for co-rotation to the bevel gear 26 arranged on the rear axle 19. The differential 27 is provided to provide a speed compensation between a first part 28 and a second part 29 of the rear axle 19. The first part 28 of the rear axle has a wheel shaft 30, and a drive wheel 31 which is attached to the wheel shaft 30. The second part 29 of the rear axle 19 likewise has a wheel shaft 32, and a drive wheel 33 which is attached to the wheel shaft 32, and is attached to a side which is located opposite the first part of the rear axle.

In order to disconnect the two parts 28, 29 of the rear axle 19 from a front part 16 of the drive train 10, the motor vehicle drive train device comprises two coupling units 12, 13, which are arranged in the flow of force after the first coupling unit 11. The coupling unit 12 is arranged on the wheel shaft 30 and connects the first part 28 of the rear axle 19 to the differential 27 in mechanically disconnectable manner. The coupling unit 13 is arranged on the wheel shaft 32 and connects the second part 29 of the rear axle 19 to the differential 27 in mechanically disconnectable manner. The coupling units 12, 13 are formed as positive-engagement units.

The coupling unit 12 is formed identically to the coupling unit 13. Below, only the coupling unit 12 will be described, with all the features of the coupling unit 12 also applying for the coupling unit 13. Solely the arrangement in the drive train 10 distinguishes between the coupling units 12, 13. The coupling unit 12 comprises two coupling halves 34, 35 which are arranged rotatably relative to one another. The coupling halves 34, 35 each have dog teeth for positive interconnection. In a closed state of the coupling unit 12, the two coupling halves 34, 35 are in positive contact by means of the dog teeth and are thereby connected together for co-rotation. The coupling unit 12 comprises an operating actuator which is provided to bring the two clutch halves 34, 35 into a positive lock.

To control the coupling units 11, 12, 13, the motor vehicle drive train device has a control and regulating unit 14. The control and regulating unit 14 is provided to control the drive engine 15 and the gearbox device 20. In this case, the control and regulating unit 14 controls at least an amount of fuel which is injected into the drive engine 15, and shifts gears in the gearbox device 20 by means of the gear actuators, which are not illustrated in greater detail.

The control and regulating unit 14 has an overrun operating mode. The overrun operating mode is provided for an overrun condition. The overrun operating mode is activated by the control and regulating unit 14 as soon as it detects an overrun condition of the motor vehicle 17. In the overrun operating mode, the control and regulating unit 14 is provided to open the first coupling unit 11 and the two second coupling units 12, 13. By opening the coupling units 11, 12, 13, a middle part 16 of the drive train 10 is completely disconnected from a rotary movement of the drive engine 15 and the drive wheels 31, 33. Owing to the mass moment of inertia and possible transmissions of rotary movement due to fluid friction, it may be that the part 16 of the drive train 10 continues to rotate for a certain time during the overrun operating mode. During the overrun condition, injection of fuel in the drive engine 15 is halted. The drive engine 15 is switched off. In principle, it is also conceivable for the drive engine 15 to continue running at a very low speed, for example an idling speed.

In a first mode for activating the overrun operating mode, the control and regulating unit 14 is initially provided to open the first coupling unit 11. For this, the control and regulating unit 14 triggers the clutch actuator, which is not illustrated in greater detail, and opens the coupling unit 11. This means that the drive engine 15 is disconnected from the part 16 of the drive train 10. A flow of force between the drive engine 15 and the drive wheels 31, 33 is interrupted. Once the coupling unit 11 is opened, the control and regulating unit 14 opens the two second coupling units 12, 13 in order to disconnect the drive train 10 at a second point. For this, the control and regulating unit 14 controls the operating actuators, which are not illustrated in greater detail, of the coupling units 11, 12 and disconnects the two coupling halves 34, 35 of the two coupling units 12, 13. This means that the part 16 of the drive train 10 is disconnected completely from a rotary movement of the drive engine 15 and the drive wheels 31, 33.

In a second mode for activating the overrun operating mode, the control and regulating unit 14 is provided initially to open the two second coupling units 12, 13. The two second coupling units 12, 13 are unloaded for opening by means of the drive engine 15. For this, the control and regulating unit 14 gives a torque jerk to the coupling units 12, 13 by means of the drive engine 15, so that the overrun condition can be briefly cancelled and the coupling units 12, 13 can be opened during a zero passage of the flow of force. Once both second coupling units 12, 13 have been opened, the control and regulating unit 14 is provided likewise to open the first coupling unit 11 and thereby to uncouple the part 16 of the drive train 10 completely from a rotary movement of the drive engine 15 and the drive wheels 31, 33.

In a mode for deactivating the overrun operating mode, the control and regulating unit 14 initially actuates the first coupling unit 11 again and thereby closes it. An actuating pressure on the operating actuator, which is not illustrated in greater detail, is lowered, which causes the coupling unit 11 to close again and the two clutch halves 21, 22 to come into frictional contact again. The control and regulating unit 14 then starts the drive engine 15 again, or brings it back up to a higher speed. In principle, it is also conceivable for the drive engine 15 to be started before the coupling unit 11 is closed again.

The control and regulating unit 14 is then provided, once the coupling unit 11 is closed and the drive engine 15 is started again, to close the two second coupling units 12, 13, which means that the drive train 10 is again completely closed. The two coupling units 12, 13 in this case are synchronized by means of the drive engine 15. If both the coupling halves 34, 35 of the two second coupling units 12, 13 attain an approximately identical speed, the two coupling halves 34, 35 may in each case be brought into a positive lock with their associated operating actuator.

Alternatively to the opening of the first coupling unit 11 or of the two second coupling units 12, 13, it is also conceivable for the drive train 10 to be disconnected in the gearbox device 20. In this case, the control and regulating unit 14 alternatively shifts the splitter unit and/or the range-change unit or the main unit of the gearbox device 20 which is formed as an auxiliary-range gearbox into a neutral position. This disconnects a flow of force in the gearbox device 20 and means that a torque can no longer be transmitted between the drive engine 15 and the drive shaft 23. Activation and deactivation of the overrun operating mode takes place here just as in the mode previously described, except for the difference that instead of opening of the coupling unit 11 the gearbox device 20 is brought into a neutral position. In principle, it is also conceivable that instead of the additional coupling units 12, 13 the range-change unit of the gearbox device 20, in addition to the first coupling unit 11 is brought into a neutral position, which means that the gearbox device 20 would be largely uncoupled from a rotary movement of the drive engine 15 and the drive wheels 31, 33. This would be conceivable for example in a configuration of a drive train 10 without the coupling units 12, 13.

What is claimed is:

1. A method for operating a motor vehicle drive train device with a drive engine (15) and a drive train (10) for driving axle wheels (31, 33), the drive train (10) comprising a first coupling unit (11) in the form of a clutch arranged close to the drive engine (15), a gear box (20) for changing the power transmission ratio for driving the axle wheels (31, 33), a differential transmission (27) arranged between, and connected to, the axle wheels (31, 33) via drive wheel shafts (30, 32), a drive shaft (23) extending between the gear box (20) and the differential transmission (27), and second coupling units (12, 13) arranged in the drive wheel shafts (30, 32), and with a control unit (14) for controlling the first and second coupling units (11, 12, 13), the control unit (14) having an overrun operating mode in which, in a first overrun condition the drive engine (15) is disconnected from the drive train (10) by opening the first coupling unit (11) close to the engine to avoid engine braking, the control unit (14) being further provided to disconnect, in a second overrun condition the drive train (10) also from the drive wheels (31, 33) by additionally opening the second coupling units (12, 13) which are arranged in the drive wheel shafts (30, 32), the first coupling unit (11) and the second coupling units (12, 13) when opened disconnecting the drive train including the gearbox (20) and also the differential transmission (27) from the drive wheels (31, 33) thereby avoiding churning losses in the gear box as well as in the differential transmission, the method comprising the steps of: opening the first coupling unit (11), in an overrun operating mode, at a first point so that the drive engine (15) is disconnected from a power transmission part (16) of the drive train (10), and, at a second point, opening the second coupling units (12, 13) for disconnecting the drive wheels (29, 31) from the power transmission part (16) of the drive train (10).

2. The method according to claim 1, wherein the overrun operating mode is activated when an overrun condition is recognized by the control unit (19).

3. The method according to claim 1, wherein in at least one operating mode, after the actuation of the first coupling unit (11) which is upstream in the flow of force of the drive train the second coupling units (12, 13) is are actuated for activating or deactivating the overrun operating mode.

4. The method according to claim 1, wherein in at least one operating mode initially the first coupling unit (11) which is upstream in a flow of force is first actuated for activating and for deactivating the overrun operating mode.

5. The method according to claim 4, wherein, upon deactivating the overrun operating mode, the second coupling units (12, 13) are synchronized by means of the drive engine (15).

* * * * *